Patented Dec. 28, 1943

2,337,909

UNITED STATES PATENT OFFICE 2,337,909 p-AMINOBENZENE - SULPHONYL - AMIDINE DERIVATIVES AND THEIR MANUFACTURE

Henry Martin and Rudolf Hirt, Basel, Switzerland, assignors to the firm of J. R. Geigy A. G., Basel, Switzerland No Drawing. Application December 20, 1940, Serial No. 371,054. In Switzerland December 19, 1939

10 Claims. (Cl. 260—397.7)

It has been found that amidine derivatives of the general formula

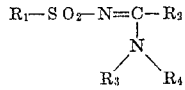

in which $R_1$ represents a benzene nucleus containing in para-position a nitrogen-containing group, $R_2$ represents a substituted or unsubstituted radical of the aliphatic, alicyclic, araliphatic, aromatic, hydroaromatic or deterocyclic series and $R_3$ and $R_4$ represent hydrogen or substituted or unsubstituted aliphatic, araliphatic, aromatic, hydroaromatic or heterocyclic radicals which, if desired, may be linked to one another, can be obtained by causing an imido halide of a benzene sulphonacylamide of the general formula

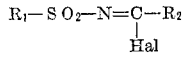

in which $R_1$ and $R_2$ have the same meanings as above given, to react with ammonia or with primary or secondary simple or mixed aliphatic amines, which may be also substituted, or with primary araliphatic, aromatic amines or primary or secondary hydroaromatic or heterocyclic amines.

The imidohalides required as parent materials for the invention may be obtained according to known processes. Thus benzene sulphonacylamides substituted in para-position by a nitrogen-containing group are treated with acid halides, particularly with the chlorides of the carbonic acid or sulphuric acid and above all of the phosphoric acid in the cold or at a raised temperature and in the presence or absence of inert solvents of diluents. The nitrogen-containing group occupying the paraposition include the nitro group as well as, for example, the azo-, azoxy-, azomethine-group and others. For the acyl radicals of the said benzene sulphonacylamides there come equally well into question: substituted or unsubstituted aliphatic mono- and di-carboxylic acids such as for instance acetic acid, chloracetic acid, alkoxyacetic acid, propionic acid, butyric acid, caproic acid, lauric acid, succinic acid, dialkyloxaminic acids and the like; furthermore, substituted or unsubstituted araliphatic carboxylic acids such as phenylacetic acid, p-chlorophenylacetic acid, methoxyphenylacetic acid, cinnamic acid, dihydrocinnamic acid, phenoxy acetic acid; furthermore substituted or unsubstituted aromatic mono- or di-carboxylic acids such as benzoic acid or its substitution products such as p-nitro- or -chlorobenzoic acid, and so on; also alicyclic carboxylic acids such as fencholic acid, camphoric acid, naphthenic acid and the like; among the hydroaromatic acids the hexahydrobenzoic acid and the methylhexahydrobenzoic acids; among the heterocyclic acids the furane-2-carboxylic acid, the pyronecarboxylic acids, the pyridine carboxylic acid, the dimethylisoxazole carboxylic acid and the like.

The starting materials which are to be converted into the imido halides are in some cases known. For example p-nitrobenzene sulphonamide or its salts are converted by the action of aliphatic, alicyclic, araliphatic, aromatic, hydroaromatic or heterocyclic acids or their functional derivatives into the corresponding p-nitrobenzene sulphonacylamides. Or the azobenzene-4-sulphonamide or its salts are converted by means of suitable acylation agents, such as for example acetic acid, into azobenzene-4-sulphonacetamide.

As amines with which, besides ammonia, the aforesaid imido halides are caused to react there are particularly suitable those which contain at least one strongly basic amino group; among the primary or secondary, simple or mixed, and if desired substituted aliphatic amines there may be cited: methylamine, ethylamine, propylamine, isopropylamine, allylamine, butylamine, dimethylamine, diethylamine, diallylamine, dipropylamine, methylpropylamine, aminoethanols, laurylamine and so on. There may be furthermore named: aniline and its substituted products such as anisidine or phenetidine, also benzylamine, piperidine, cyclohexylamine, pipecoline, lupetidine and so forth.

The amines react with the imido halides either directly or in the presence of inert solvents; the reaction also proceeds in the presence of tertiary bases such as pyridine, quinoline or dimethylaniline. The new amidine derivatives are in many cases soluble in hot water; they may be easily recrystallised therefrom. They are insoluble in alkali solutions, but, on the other hand, they form stable salts with acids.

A further method of making the said benzene sulphonamidines substituted in para-position by a nitrogen-containing group in accordance with the present invention consists in causing a benzene sulphonic acid halide containing in para-position a nitrogen-containig group to react with amidines. As amidines the substituted, for example alkylated or aralkylated amidines are equally suitable. For example the same compound can be obtained either by the action of p-nitrobenzene sulfonic acid chloride on acetamidine or by the action of ammonia on p-nitrobenzenesulphonyl-acetimidochloride followed by reduction according to Béchamp or catalytic reduction.

The claimed new amidine derivatives are especially suitable as chemo-therapeutic agents. In form of their salts with inorganic or organic acids, such as for instance in form of chlorhydrates, sulphates, lactates and the like, they are soluble in water.

The following examples illustrate the invention, the parts being by weight unless otherwise stated.

Example 1

24 parts of p-nitrobenzene sulphonacetamide are intermixed with 24 parts of phosphorus pentachloride and the mixture is heated for 4 hours on the water-bath. The mixture gradually passes into a homogeneous solution with evolution of hydrogen chloride. The phosphorus oxychloride formed is distilled off as far as possible in vacuo at about 95° C., the residue is taken up in hot ligroine (boiling point 140–160° C.), decanted from a small quantity of a dark insoluble oil and allowed to cool. Thereby the imidochloride of the p-nitrobenzene sulphonacetamide separates out in form of colorless crystals, which are filtered by suction and washed with petroleum ether. Melting point=114° C.

By introducing dry ammonia into a solution of p-nitrobenzene sulphonimidochloride in benzene the p-nitrophenylsulphonamidine is obtained, which, when recrystallised from alcohol, melts at 190° C. By catalytic hydrogenation in dioxane in the presence of nickel it is converted into the corresponding amine, which can easily be crystallised from water; melting point: 149° C. The N-(p-aminobenzenesulphone)-acetamidine possesses the following formula:

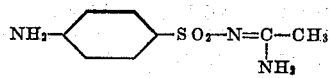

Example 2

9.45 parts of acetamidine hydrochloride are suspended in 50 parts by volume of dry pyridine and 22 parts of p-nitrobenzene sulphonic acid chloride are added thereto. After stirring for 5 hours at 50–60° C. the whole is cooled and poured into ice cold hydrochloric acid. Thereby the condensation product precipitates slowly out in crystalline form. It is filtered by suction and recrystallised from alcohol. Melting point at 190° C.

Analysis, N: calculated, 18.7 per cent; found, 19.0 per cent.

The nitro compound is reduced with hydrogen in presence of nickel. After evaporation of the solvent there remains the amine in form of a thin yellowish oil. It is shaken with water, whereupon it solidifies after some time. Melting point: 147–149° C.

Analysis, N: calculated, 19.7 per cent; found, 19.94 per cent.

The amidine has the same constitution as the compound obtained according to Example 1. The two products show a mixed melting point of 149° C. The product is insoluble in alkalies.

Example 3

A solution of p-nitrobenzenesulphonacetimido chloride in benzene is vigorously shaken for ½ hour with an excess of an aqueous methylamine solution. A golden yellow product separates out, which is then filtered off, washed with water and recrystallised from alcohol. There are obtained feebly yellowish crystals of the melting point 152° C.

The nitro-body thus obtained is then reduced catalytically in dioxane by means of hydrogen and in the presence of a nickel catalyst. The N-(p-aminobenzenesulphone)-N'-methyl-acetamidine melts, when recrystallised from hot water, at 201° C. It has the following constitution:

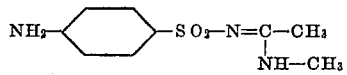

The same N-(p-aminobenzenesulphone)-N'-methyl-acetamidine is obtained by condensation of N-methyl-acetamidine with p-nitrobenzenesulphonic acid chloride and subsequent reduction.

Example 4

A solution of the imido chloride according to Example 1 in benzene is caused to react with 2 molecules of ethylamine, whereby a precipitate is soon separated out. It is filtered and washed with water. The ethylamine hydrochloride is thus dissolved and the remaining residue is then recrystallised from alcohol. Melting point: 100° C.

The nitro product thus obtained is reduced in dioxane by means of hydrogen (in the presence of a nickel catalyst). When being recrystallised from water the amine shows a melting point of 160° C. The N-(p-aminobenzenesulphone)-N'-ethyl-acetamidine has the formula

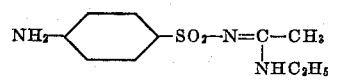

Instead of ethylamine there may also be used isopropylamine. Thus the N-(p-aminobenzenesulphone)-N-isopropyl-acetamidine is obtained.

The same N-(p-aminobenzenesulphone)-N'-ethyl-acetamidine is obtained by condensation of N-ethyl-acetamidine with p-nitrobenzenesulphonic acid chloride and subsequent reduction.

Example 5

1 molecule of the imido chloride of p-nitrobenzenesulphonacetamide is dissolved in benzene and mixed with the calculated quantity of diethylamine. After 2 hours the formed precipitate is sucked off, washed with water and recrystallised from alcohol. Melting point 133° C.

The nitro compound thus obtained is reduced in dioxane to the amine by means of hydrogen (in the presence of a nickel catalyst). There results the N-(p-aminobenzenesulphone)-N'-diethyl-acetamidine of the following formula:

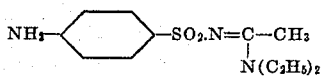

After recrystallisation from water this compound melts at 106° C.

Instead of diethylamine there can also be used the dimethylamine. The nitro compound melts at 170° C., while the amine melts at 174° C.

Example 6

20 parts of diallylamine are dissolved in 100 parts of dry pyridine, then mixed with 40 parts of imidochloride of the p-nitrobenzenesulphonacetamide, while stirring, and the whole is kept for one hour at 10° C. Stirring is continued for a further hour at 20° C. and then the mixture is caused to run into ice cold hydrochloric acid. A reddish colored thick oil separates out, which is taken up in benzene, washed with dilute hydrochloric acid, dried and finally freed from solvent. Without further purification the product is reduced with iron according to Béchamp. The reaction mixture rendered weakly alkaline is extracted with mixture of acetone and alcohol, whereupon the solvent is expelled. The residue is taken up in dilute hydrochloric acid, shaken out with benzene and ether and the hydrochloric acid solution then mixed with alkali. A thick resin separates out, which slowly solidifies. After re-crystallisation from water the new light yellow body has a melting point of 132–133° C.

The N-(p-aminobenzenesulphone)-N'-diallyl-acetamidine has the following formula:

$$NH_2-\langle\rangle-SO_2N=C-CH_3$$
$$\qquad\qquad\qquad |$$
$$\qquad\qquad\qquad N(CH_2-CH=CH_2)_2$$

Example 7

26 parts of p-nitrobenzenesulphonacetimido chloride are dissolved in 100 parts by volume of acetone and, while stirring and cooling, slowly mixed with a solution of 20 parts of ethanolamine in 50 parts of acetone. After standing for some time the reaction mixture is introduced, while stirring, into cold dilute hydrochloric acid and the product precipitated is filtered by suction and washed with water. After recrystallisation from alcohol the new nitro compound melts at 164–165° C. By catalytic reduction in dioxane in the presence of a nickel catalyst it is converted into a product of the following formula $$NH_2-\langle\rangle-SO_2.N=C-CH_3$$
$$\qquad\qquad\qquad |$$
$$\qquad\qquad\qquad NH-CH_2-CH_2-OH$$

This product is water-soluble and forms a feebly yellowish crystalline powder of the melting point 178° C.

Example 8

If, in Example 1, monoallylamine is used instead of monomethylamine, there results a compound of the following formula:

$$NH_2-\langle\rangle-SO_2-N=C-CH_3$$
$$\qquad\qquad\qquad |$$
$$\qquad\qquad\qquad NH-CH_2-CH=CH_2$$

which has the melting point of 115–116° C.

By reduction with iron according to Béchamp there results the N-(p-aminobenzenesulphone)-N'-allyl-acetamidine of the melting point 150° C., when recrystallised from water.

By catalytic hydrogenation (in the presence of a nickel catalyst) there is obtained a saturated amidine of the following formula $$NH_2-\langle\rangle-SO_2-N=C-CH_3$$
$$\qquad\qquad\qquad |$$
$$\qquad\qquad\qquad NH-CH_2-CH_2-CH_3$$

which melts at 167–168° C.

If n-butylamine is used, one obtains after the reduction N-(p-aminobenzenesulphone)-N'-n-butyl-acetamidine of the melting point 168–169° C.

By using isobutylamine the isomer compound is obtained.

Example 9

20 parts of piperidine are dissolved in 100 parts by volume of alcohol and mixed with small quantities of 13 parts of p-nitrobenzenesulphon-acetimidochloride, while stirring and cooling. The solution becomes immediately yellow and, after some time a sandy precipitate separates out, which after some standing is sucked off and dried. Melting point 170° C.

N : calculated, 13.5 per cent; found 13.4 per cent.

By catalytic reduction with nickel-kieselguhr in dioxane there is obtained a compound of the following formula $$NH_2-\langle\rangle-SO_2-N=C-CH_3$$
$$\qquad\qquad\qquad\qquad |$$
$$\qquad\qquad\qquad\qquad N$$
$$\qquad\qquad\qquad\;\;/\;\;\;\backslash$$
$$\qquad\qquad\;\;CH_2\quad CH_2$$
$$\qquad\qquad\;\;|\qquad\;\;\;|$$
$$\qquad\qquad\;\;CH_2\quad CH_2$$
$$\qquad\qquad\;\;\;\backslash\;\;\;/$$
$$\qquad\qquad\qquad CH_2$$

Melting point 155° C.

NH$_2$ : calculated, 5.7 per cent; found, 5.7 per cent.

Instead of piperidine there may also be used pipecoline, lupetidine or morpholine. For instance the morpholine derivative after reduction melts at 212° C.

Example 10

51 parts of p-nitrobenzenesulphone-propionamide are heated for 4 hours on the water-bath with 45 parts of phosphorus pentachloride. When evolution of hydrochloric acid is finished the phosphorus oxychloride formed is distilled off in vacuo. The residue is triturated with a small quantity of ice cold methanol, then sucked off and washed with cold methanol. Melting point 78–79° C. The yield of imido chloride of the p - nitrobenzenesulphone - propionamide is nearly quantitative.

25 parts of p-nitrobenzenesulphone-propionimido chloride are dissolved in 300 parts by volume of absolute ether and saturated with ammonia gas while cooling with ice water. After the mass has been allowed to stand for 2 hours at ordinary temperature, the whole precipitate is filtered under suction, washed with water and recrystallised from alcohol. The N-(p-nitrobenzenesulphone)-propionamidine obtained melts at 157° C.

By catalytic reduction (in the presence of a nickel catalyst) there is obtained the N-(p-aminobenzenesulphone)-propionamidine of the melting point 151–152° C. It has the following formula:

$$NH_2-\langle\rangle-SO_2-N=C-CH_2-CH_3$$
$$\qquad\qquad\qquad\qquad |$$
$$\qquad\qquad\qquad\qquad NH_2$$

Instead of ammonia there may also be used methylamine, ethylamine, as-diethylethylene diamine, isopropylamine, allylamine, cyclohexylamine, cyclopentylamine and the like.

Instead of p-nitrobenzenesulphone-propionimido chloride there may be also used the p-dimethylamino- or p-toluylsulphamido-benzenesulphone-propionimido chloride.

Example 11

30.6 parts of p-nitrobenzenesulphone-benzamide and 25 parts of phosphorus pentachloride are mixed together and heated for 5 hours to 100° C. The mixture is cooled, whereby after some time the imido chloride separates out in crystalline form. The phosphorus oxychloride produced is eliminated by suction at 50–60° C. in vacuo, the residue is triturated with dry ether, the crystalline powder is sucked off and washed with ether. Melting point 160–162° C. The obtained product is difficultly soluble in ether and cold benzene, but easily soluble in chloroform and hot benzene.

Instead of the p-nitrobenzesulphone-benzamide there may be used the p-nitrobenzenesulphone-Δ1-tetrahydrobenzamide or the p-nitrobenzenesulphonephenylacetic acid amide.

25 parts of p-nitrobenzenesulphone-benzimido chloride are dissolved in 150 parts by volume of chloroform and saturated, under cooling, with ammonia gas. After 1 hour the reaction mixture is shaken with water and the precipitate is sucked off. Recrystallised from a large quantity of alcohol this product forms a nearly white crystalline powder of the melting point 177–179° C. By catalytic reduction there is obtained the N-(p - aminobenzenesulphone) - benzamidine of the melting point 203° C. and of the following formula:

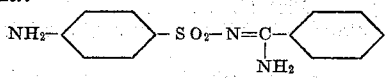

Instead of ammonia there may equally well be used an aliphatic amine.

If instead of the benzoic acid there is used the p-methoxyphenylacetic acid, β-phenylpropionic acid, cinnamic acid and so on for the manufacture of amidines, compounds of similar properties are obtained.

*Example 12*

45 parts of sodium p-nitrobenzenesulphonamide are suspended in 110 parts by volume of introbenzene, then mixed with 16 parts of N-diethyl-oxamic acid chloride, B. P. at 14 mm=95–98° C., and the whole is stirred during 4 hours. The temperature rises to about 40° C. Then water and dilute caustic soda lye are added to the mixture until the reaction is alkaline to lithmus, undissolved p-nitrobenzenesulphonamide is removed by filtering, the aqueous layer is extracted with ether and then acidified. The p-nitrobenzenesulphondiethylamidoxamide separates out in form of a resin which quickly solidifies. The product is recrystallised from alcohol and has then a melting point of 167–168° C.

16 parts of p-nitrobenzenesulphone-diethylamido-oxamide and 11 parts of phosphorus pentachloride are mixed together and heated on the water-bath for several hours. The formed phosphorus oxychloride is sucked off in vacuo whereby the imido chloride of the p-nitrobenzene-sulfone-diethylamido-oxamide remains in the form of an oil. The ethereal solution is saturated with ammonia gas in the cold and the precipitate obtained filtered off under suction after one hour. It is first washed with ether and then with water. There is obtained a thick oil which slowly solidifies. The nitro compound is recrystallised from water in the presence of animal charcoal and then melts at 137° C.

N: calculated, 17.1 per cent; found, 17.0 per cent.

By catalytic reduction with nickel and hydrogen the N-(p-aminobenzenesulphone)-N'-diethylamido-oxamidine is obtained. It forms a slowly solidifying, water-soluble resin.

*Example 13*

27.8 parts of p-nitrobenzenesulphone-chloracetamide, melting point 170° C., and 25 parts of phosphorus pentachloride are mixed together and heated on the water-bath for 7 hours. The reaction mixture is cooled down until it has all solidified, whereupon it is triturated with dry ether, filtered under suction, washed with ether and recrystallized from benzene. Melting point 130° C.

Analysis: active chlorine: found, 11.9 per cent; calculated, 11.9 per cent; molecular weight, 297.

Total chlorine: found, 23.8 per cent; calculated, 23.8 per cent.

10 parts of p-nitrobenzene sulphone-chloracetimido chloride are dissolved in 200 parts by volume of acetone and mixed with 150 parts of an aqueous solution of dimethylamine of 21.4 per cent strength while stirring at 0° C. After standing for some time fine needles separate out. They are sucked off and washed with water. They are free from chlorine and melt at 143–144° C. The nitro compound is readily soluble in dilute hydrochloric acid.

N: calculated, 17.8 per cent; found, 17.9 per cent.

The constitution of the N-(p-nitrobenzenesulphone)-N'-dimethyl-N''-dimethylaminoacetamidine is the following one:

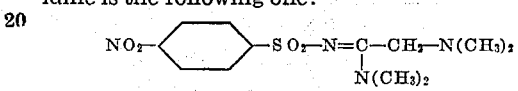

By catalytic reduction there is obtained the N-(p-aminobenzenesulphone)-N'- dimethyl-N''-dimethylamino-acetamidine of the melting point 193–194° C. Instead of the dimethylamine there may also be used diethylamine or other primary and secondary amines, such as piperidine, benzylamine, p-methoxybenzylamine, aniline, p-anisidine, p-phenetidine, p-chloroaniline, phenylhydrazine and the like.

*Example 14*

31 parts of p-nitrobenzenesulphone-hexahydrobenzamide (made from sodium p-nitrobenzenesulphonamide and hexahydrobenzoic acid chloride) are mixed with 25 parts of phosphorus pentachloride and the mixture is heated on the water-bath for 3 hours. The formed phosphorus oxychloride is distilled in vacuo ,the oily p-nitrobenzenesulphonhexahydrobenzimido chloride is taken up in absolute ether and the etheral solution is saturated in the cold with ammonia. After some time the excess of ammonia, together with the solvent, is removed by distillation on the water-bath. The residue which has first been washed with water and then recrystallised from alcohol has a melting point of 188–190° C.

By catalytic reduction there is obtained the N-(p-aminobenzenesulphone)-hexahydrobenzamidine of the following formula

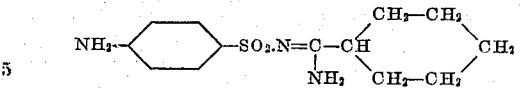

Melting point 150–151° C.

NH2: calculated, 5.7 per cent; found, 5.6 per cent.

If instead of the hexahydrobenzoic acid compound there is used 1-cyclohexenylacetic acid, 1-cyclopentenecarboxylic acid, furane-2-carboxylic acid and the like in the above example or by using aniline, benzylamine or morpholine instead of ammonia, amidines of similar properties are finally obtained.

*Example 15*

22 parts of isovalerylamidine hydrochloride are dissolved in 50 parts by volume of dry pyridine and 37 parts of p-nitrobenzenesulphonic acid chloride are added thereto by small portions. The temperature rises up to about 40° C. and is then kept at about 50° C. for 4 hours. The reaction mixture is poured into cold dilute hydrochloric acid and extracted with ether. The N-

(p-nitrobenzenesulphone) - iso - valerylamidine has, when recrystallised from alcohol, the melting point of 142–144° C. It may also be obtained from ammonia and p-nitrobenzenesulphone-isovalerylimido chloride (made from phosphorus pentachloride and p-nitrobenzenesulphone-isovaleric acid amide).

By catalytic reduction (with hydrogen and in the presence of nickel) the nitro compound is converted into the N-(p-aminobenzenesulphone)-isovalerylamidine. It melts, when recrystallised from alcohol, at 118–120° C. and has the following formula:

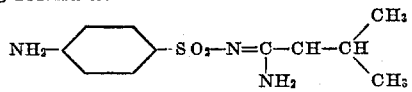

Instead of isovaleric acid there may also be used n-capronic acid, diethylacetic acid, oenanthylic acid, and the like for the manufacture of amidines.

What we claim is:

1. A process for the manufacture of amidine derivatives, comprising causing an imido halogenide of the following general formula

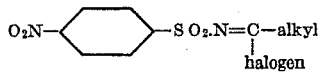

to react with an aliphatic, non-tertiary amine and reducing the nitro group of the amidine compound to the amino group.

2. A process for the manufacture of an amidine derivative, comprising causing the imido halogenide of the formula

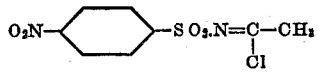

to react with isopropylamine and reducing the nitro group of the amidine compound to the amino group.

3. A process for the manufacture of an amidine derivative, comprising causing the imido halogenide of the formula

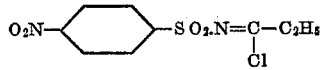

to react with ammonia and reducing the nitro group of the amidine compound to the amino group.

4. A process for the manufacture of an amidine derivative, comprising causing the imido halogenide of the formula

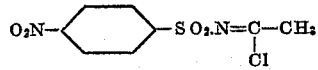

to react with ethylamine and reducing the nitro group of the amidine compound to the amino group.

5. The amidine derivatives of the following general formula

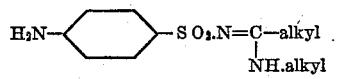

said amidine derivatives being colorless compounds whose salts with acids are soluble in water and possess therapeutical properties.

6. The amidine of the following formula

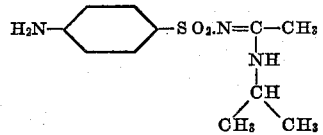

being a colorless compound whose salts with acids are soluble in water and possess therapeutical properties.

7. The amidine of the following formula

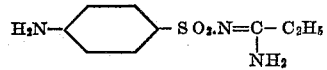

being a colorless compound whose salts with acids are soluble in water and possess therapeutical properties.

8. The amidine of the following formula

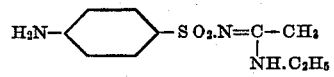

being a colorless compound whose salts with acids are soluble in water and possess therapeutical properties.

9. A process of the character described which comprises reacting an imino halogenide of the formula

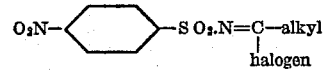

with a nitrogen compound containing exchangeable hydrogen at the nitrogen atom and selected from the class consisting of ammonia, primary and secondary alkylamines, primary aralkylamines and primary mononuclear arylamines, and reducing the nitro group of the resulting amidine to the amino group.

10. A compound of the formula

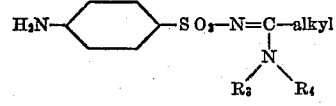

wherein $R_3$ and $R_4$ each represents a member of the group consisting of H, alkyl, aralkyl and mononuclear aryl, being a colorless compound whose salts with acids are soluble in water and possess therapeutical properties.

HENRY MARTIN.
RUDOLF HIRT.